United States Patent

Hoogen et al.

(10) Patent No.: US 6,579,965 B2
(45) Date of Patent: Jun. 17, 2003

(54) PROCESS FOR THE ANIONIC POLYMERIZATION OF LACTAMS

(75) Inventors: Nicola Hoogen, Munich (DE); Andreas Wollny, Freiburg (DE); Heike Faulhammer, Serquigny (FR); Rolf Muelhaupt, Freiburg (DE)

(73) Assignee: Atofina (FR)

( * ) Notice: Subject to any disclaimer, the term of this patent is extended or adjusted under 35 U.S.C. 154(b) by 0 days.

(21) Appl. No.: 09/960,730

(22) Filed: Sep. 24, 2001

(65) Prior Publication Data

US 2002/0161167 A1 Oct. 31, 2002

(30) Foreign Application Priority Data

Sep. 22, 2000  (FR) .............................................. 0012084

(51) Int. Cl.[7] ........................ C08G 69/08; C08G 73/00; C08G 69/14
(52) U.S. Cl. ....................... 528/323; 528/310; 528/315; 528/312; 528/324; 528/326; 264/143; 264/144
(58) Field of Search ................................. 528/310, 312, 528/315, 323, 324, 326; 264/143, 144

(56) References Cited

U.S. PATENT DOCUMENTS

| 3,875,121 A | * | 4/1975 | Brassat et al. | ............... | 528/326 |
| 5,747,634 A | | 5/1998 | Schmid et al. | ............... | 528/315 |
| 5,760,164 A | * | 6/1998 | Schmid et al. | ............... | 528/310 |
| 5,864,007 A | * | 1/1999 | Schmid et al. | ............... | 528/323 |
| 5,895,808 A | | 4/1999 | Schmid et al. | ............... | 528/310 |

* cited by examiner

Primary Examiner—P. Hampton-Hightower
(74) Attorney, Agent, or Firm—Millen, White, Zelano & Branigan, P.C.

(57) ABSTRACT

For the anionic polymerization of lactams: (a) (i) a catalyst capable of creating a lactamate and (ii) a regulator chosen from amides of formula R1-NH—CO-R2, in which R1 can be substituted by an R3-CO—NH— or R3-0— radical and in which R1, R2 and R3 denote an aryl, alkyl or cycloalkyl radical, are dissolved in the molten lactam, (a1) the solution from stage (a) is cooled, optionally to the solid state in a form which can be divided, (a2) the product from stage (a1) is optionally reheated to a temperature below the polymerization temperature of the lactam, (a3) optionally, the product from stage (a1) is reheated and is maintained at a temperature between the melting temperature of the lactam and 15° C. above, and (b) the produce from any one of stages (a1), (a2) or (a3) is introduced into a mixing device or mold and is then heated to a temperature sufficient to obtain the bulk polymerization of the lactam.

40 Claims, No Drawings

PROCESS FOR THE ANIONIC POLYMERIZATION OF LACTAMS

FIELD OF THE INVENTION

The present invention relates to a process for the anionic polymerization of lactams. The production of polyamide by the anionic route consists in adding a catalytic system to a lactam and in then heating in order to obtain the polyamide in a few minutes. The catalytic system is composed of a catalyst, consisting of a strong base capable of forming a lactamate, and of an activator (sometimes referred to as a regulator), such as a bisamide. Mention may be made, as examples of strong bases, of sodium and sodium hydride and mention may be made, as examples of regulators, of ethylenebisstearamide (EBS) and ethylenebisoleamide. A filler, such as glass fibres, can also be added to the lactam, before its polymerization and in addition to the catalytic system. A reinforced material is thus obtained directly. The present invention relates to the catalytic system and more particularly the way of preparing it, of storing it and of using it to bring about the polymerization of the lactam.

THE PRIOR ART AND THE TECHNICAL PROBLEM

Application FR 2 291 231 discloses the polymerization of lactams in the presence of a catalytic system composed (i) of a product chosen from sodium, potassium, alkali metal hydrides and alkali metal hydroxides and (ii) of a product chosen from organic isocyanates, from ureas, from amides and from acid chlorides. The example describes only the use of sodium hydride and of a promoter, without specifying the name thereof. The extruder is fed with the blend of lactam, of hydride and of promoter at 170° C., the extruder being at 250° C. There is nothing written or suggested regarding storage of this blend of unknown composition and even less regarding its stability. According to this technique, it is necessary to add the catalytic system to the lactam immediately before the polymerization.

The work Book of Abstracts 212 ACS Meeting (1996) in chapter 19, pages 255 to 266, published in 1998 by the American Chemical Society describes the polymerization of caprolactam in the presence of lactamate and of N-acyllactams. The two components of the catalytic system are mixed with a lactam stream and these streams are brought into contact in the polymerization reactor, either batchwise or continuously. This process is theoretically more flexible than the preceding process since each of the lactam solutions, not comprising a complete catalytic system, cannot polymerize as long as they are not mixed. On the other hand, this process has the disadvantage that it is necessary to accurately meter these two streams of the reaction mixture in order to obtain the correct proportions of catalyst and of activator and thus to obtain a polyamide with the desired characteristics. It is necessary to thoroughly mix the two streams in order for the catalyst and the activator to be properly distributed in the lactam but the polymerization begins before the reactor.

Patent EP 231381 discloses the preparation of polyamide items reinforced by carbon fibres, in which the carbon fibres are placed in a mould and then two lactam streams are introduced into this mould. One of the streams comprises a catalyst and the other comprises the regulator. Patent EP 491043 discloses a similar technique. These two European patents disclose techniques similar to what is described in the abovementioned work published by the ACS.

Patent EP 786 482 discloses the polymerization of lactams using a liquid catalytic system which is added in a proportion of 3 to 10 parts to 100 parts of lactam to be polymerized. This catalytic system is composed of an N-alkyl-2-pyrrolidone, of caprolactam, of a sodium lactamate and of a diisocyanate blocked by a lactam. The temperature of this catalytic system must not exceed 70° C., then it is added to the lactam and heating is carried out. For example, it results in the polymerization of lactam 12 from 175° C.

Patent EP 786485 discloses a similar process but the N-alkyl-2-pyrrolidone can be entirely or partially replaced by a substituted urea, such as N,N'-dimethylpropyleneurea.

Patent EP 872508 discloses the polymerization of lactams using a liquid catalytic system which is added in a proportion of 3 to 7 parts to 100 parts of lactam to be polymerized. This catalytic system is composed of a solvent, such as dimethylpropyleneurea, of caprolactam, of sodium methoxide and either of a diisocyanate blocked by a lactam or of cyclohexylcarbodiimide. This catalytic solution must subsequently be cooled to ambient temperature, then it is added to the lactam and heating is carried out in order to bring about the polymerization of the lactam.

The processes disclosed in these three preceding European patents have the disadvantage of introducing impurities into the lactam and thus into the polyamide. The catalytic systems disclosed bring about the polymerization of lactam 12 from 175° C., which does not make possible good impregnation of the fibres when the polymerization is carried out in the presence of glass fibres since the viscosity increases too quickly. Furthermore, the solutions of the catalytic system which are disclosed are not completely stable.

A catalytic system has now been found which is a mixture of a strong base capable of giving a lactamate and of an amide or a bisamide in solution in the lactam. As regards, for example, lactam 12, this solution is stable for 24 hours at 160° C. This solution can comprise the amounts of catalyst and of activator which are sufficient to bring about its polymerization as soon as it is heated to a sufficient temperature; for example, for lactam 12, it is sufficient to heat to between 200 and 350° C., preferably between 230 and 300° C., in order for polymerization to take place in a few minutes. The polymerization of lactam 12 only significantly begins starting from 230° C. which, when polymerization is carried out in the presence of glass fibres, gives the lactam the time to thoroughly impregnate the glass fibres. This solution can also comprise much more catalyst and activator than is necessary to polymerize the lactam in which they are dissolved; it is thus a masterbatch which is added to lactam in an amount such that there are sufficient proportions of catalyst and of activator to bring about the polymerization of the whole of the lactam. It has thus been found that this solution could be cooled to ambient temperature and thus become solid and could then subsequently be reheated without any loss in activity. This solution can be cooled in a device such that it is converted into granules, into powder, into chips or into pellets. This conversion is particularly useful when it is a masterbatch. This form of the invention is particularly easy to implement; complicated preparations no longer have to be carried out. It is sufficient to take lactam of commercial quality and to add thereto the granules, the powder, the chips or the pellets, which may be available in bags or in containers. It is also possible, depending upon the circumstances of the polyamide production, such as the availability of the moulds or mould-release time, to reheat these granules and thus to have available a stable solution ready to be added to the lactam to be polymerized.

BRIEF DESCRIPTION OF THE INVENTION

There is now provided, according to a first embodiment, a novel process for the anionic polymerization of lactams, in which:

(a) (i) a catalyst capable of creating a lactamate and (ii) a regulator chosen from amides of formula R1-NH—CO—R2, in which R1 can be substituted by an R3-CO—NH— or R3-O— radical and in which R1, R2 and R3 denote an aryl, alkyl or cycloalkyl radical, are dissolved in the molten lactam, (a1) the solution from stage (a) is cooled, optionally to the solid state preferably in particulate form, (a2) the product from stage (a1) is optionally reheated to a temperature below the polymerization temperature of the lactam, (a3) optionally, the product from stage (a1) is reheated and is maintained at a temperature between the melting temperature of the lactam and 15° C. above, (b) the product from any one of stages (a1), (a2) or (a3) is introduced into a mixing device and is then heated to a temperature sufficient to obtain the bulk polymerization of the lactam.

According to a second form of the first embodiment, molten lactam not comprising the mixture of catalyst and of regulator is also introduced in stage (b), that is to say that the solution from stage (a) is a masterbatch. It comprises more catalyst and regulator than is necessary to polymerize the lactam in which they are dissolved.

According to a third form of the first embodiment, the polymerization of the lactam is carried out in the presence of one or more polymers (A) which is/are introduced either into the solution (a) or into the mixing device of stage (b) or into the molten lactam which is additionally added according to a second form of the invention or according to any combination of these possibilities.

According to a fourth form of the first embodiment, the polymerization of the lactam is carried out in the presence of one or more fillers which is/are introduced either into the solution (a) or into the mixing device of stage (b) or into the molten lactam which is additionally added according to the second form of the invention or according to any combination of these possibilities. It is also possible to combine the third and the fourth forms of the invention.

According to a second embodiment of the invention, stage (b) is replaced by stage (b1), in which the product from any one of stages (a1), (a2) or (a3) is introduced into a mould and is then heated to a temperature sufficient to obtain the bulk polymerization of the lactam. A polyamide item is thus obtained directly (technology referred to as "RIM" technology). This second embodiment can also be carried out according to several forms, as above.

According to a second form of the second embodiment, molten lactam comprising neither catalyst nor regulator is added in stage (b1), in addition to the product from any one of stages (a1), (a2) or (a3), which is a masterbatch. This molten lactam is optionally blended in line with that originating from any one of stages (a1), (a2) or (a3), before introduction into the mould.

According to a third form of the second embodiment, the polymerization of the lactam is carried out in the presence of one or more polymers (A) which is/are introduced either into the solution from stage (a) or into the mould or into the molten lactam which is added in the second form in addition to that originating from any one of stages (a1), (a2) or (a3) or alternatively during the in line blending in this second form or a combination of all these possibilities.

According to a fourth form of the second embodiment, the polymerization of the lactam is carried out in the presence of one or more fillers which is/are introduced either into the solution from stage (a) or into the mould or into the molten lactam which is added in the second form in addition to that originating from any one of stages (a1), (a2) or (a3) or alternatively during the in line blending in the second form or a combination of all these possibilities. It is also possible to combine the third and the fourth forms of the invention.

The present invention also relates, as novel product, in the first and second forms of its first embodiment, to the product from stage (a1) in the solid form which can be divided.

DETAILED DESCRIPTION OF THE INVENTION

Mention may be made, as examples of lactams, of those which have from 3 to 12 carbon atoms on the main ring, which atoms can be substituted, e.g. hydrocarbon, especially alkyl substituted. Mention may be made, for example, of β,β-dimethylpropiolactam, α,α-dimethylpropiolactam, amylolactam, caprolactam, capryllactam and lauryllactam. The invention is of particular use for caprolactam and lauryllactam.

The catalyst is a base which is sufficiently strong to create a lactamate. Mention may be made, as examples of catalysts, of sodium, potassium, alkali metal hydrides, alkali metal hydroxides or alkali metal alkoxides, such as sodium methoxide or ethoxide.

It would not be departing from the scope of the invention to replace the catalyst, totally or in part, by a lactamate already made. If lauryllactame is to be polymerized then the lactamate is advantageously a caprolactamate or a lauryllactamate.

As regards the regulator and the R1, R2 and R3 radicals, examples of aryl radicals can be phenyl, para-tolyl or α-naphtyl. Examples of alkyls can be methyl, ethyl, n-propyl and n-butyl radicals and an example of a cycloalkyl radical is cyclohexyl.

The preferred amides are those in which R1 and R2, which are identical or different, are phenyl or an alkyl having at most 5 carbon atoms, it being possible for R1 to be substituted by R3-O—, R3 being an alkyl having at most 5 carbon atoms. Mention may be made, for example, of acetanilide, benzanilide, N-methylacetamide, N-ethylacetamide, N-methylformamide and (4-ethoxyphenyl)acetamide. Other preferred amides are alkylenebisamides, such as ethylenebisstearamide (EBS) and ethylenebisoleamide.

The terms "catalyst", "activator" and "regulator" are used for reasons of clarity of the text and also because they are used by everyone skilled in the art of the anionic polymerization of lactams. In the present invention, the catalyst is any product capable of creating a lactamate and the regulator (or activator) is any product from the family defined above which, in addition to the action of the catalyst, brings about the polymerization of the lactam. Thus, the catalyst is employed in lactamate forming quantities and the regulator is employed in conjunction with the catalyst in lactam polymerizing quantities. Thus, the following ratios are used in general, but ratios outside of such proportion can also be used as long as the amounts are functional.

The ratio of the catalyst to the regulator, in moles, can be between 0.5 and 2 and preferably between 0.8 and 1.2. For the regulator, this is the number of moles of amide groups.

The proportion of catalyst in the lactam can be between 0.1 and 5 mol per 100 mol of lactam and preferably between 0.3 and 1.5. As regards the first form of the invention, of the first or of the second embodiment, it is these proportions of catalyst and of regulator which are in the lactam of stage (a). As regards the second form of the invention, of the first or of the second embodiment, that is to say if the solution from stage (a) is a masterbatch, the proportions in the solution from stage (a) are higher but these proportions (0.1 to 5 per 100 mol of lactam) are observed with respect to all the lactam involved in the polymerization in stage (b) or (b1). Advantageously, the proportion of catalyst in this solution from stage (a) regarded as masterbatch, is between 5 and 50 mol per 100 mol of lactam. As regards the other forms of the invention, of the first or of the second embodiment, these proportions (0.1 to 5 per 100 mol of lactam) are observed with respect to all the lactam involved in stage (b) or (b1).

If a lactamate is used instead of a catalyst, the man skilled in the art can choose the proportions according to the proportions of the catalyst.

The catalyst and the regulator are added to the molten lactam, which has been dehydrated and rendered inert beforehand. Vacuum distillations can be carried out in order to dehydrate the lactam and optionally the catalyst and the regulator.

Stage (a1) consists in cooling the solution of stage (a) by any means, including natural cooling. The product is advantageously brought to a divided form, such as granules, powder, chips or pellets. These techniques are known per se. The cooling and the operation in which the product is brought to the divided form can be combined. Mention may be made, by way of example, of cooling on a metal conveying belt in a nitrogen atmosphere or a machine such as a pelletizer.

The product from stage (a1), optionally in the solid form which may be divided, can be introduced as is in stage (b) but advantageously it is heated in stage (a2), to a temperature below the polymerization temperature of the lactam, which makes it possible to reduce the energy to be provided in stage (b) or (b1).

The temperature of the stable solution from stage (a3) is generally between the melting temperature and 15° C. above the melting temperature. As regards lactam 12, this temperature can be between 155 and 180° C. and preferably between 160 and 170° C. The procedure is carried out at atmospheric pressure; it is not necessary to complicate the equipment since the pressure is without effect on the polymerization.

In stage (b) or (b1), the lactam, the catalyst, the regulator and optionally the polymer (A) and/or the fillers are brought to a temperature which is sufficient to obtain the bulk polymerization of all the lactam. The higher this temperature, the faster the reaction. For example, for lactam 12, this temperature is between 200 and 350° C. and preferably between 230 and 300° C. As regards caprolactam, this temperature is between 200 and 350° C. and preferably between 230 and 300° C. It is recommended for the temperature which is chosen for the polymerization to be greater than the melting temperature of the polymer obtained. The duration of the polymerization is generally less than 15 minutes and generally in the order of 2 to 5 minutes. Stage (b) can be carried out in any system of continuous or batchwise reactors used for melt polymerization, such as a mixer or an extruder. Stage (b1) is carried out in the usual devices of "RIM" technology. These techniques are disclosed in EP 791618 and EP 231381 and in the work Encyclopedia of Polymer Science and Engineering, 14, pp. 72–100.

The third form of the first or the second embodiment, is particularly useful for preparing blends (or alloys) of polymers. By polymerizing the lactam in the presence of the polymer (A), a much more intimate blend of the polylactam (polyamide) and of the polymer (A) is obtained than by the usual process for melt blending (or mixing) the polymer (A) and the polyamide. It is the same in the fourth form of the invention, of the first or of the second embodiment, where better contact between the polyamide and the fillers results therefrom. The polymer (A) can be partially dissolved in the lactam or can be introduced in the device of stage (b) or (b1) in the molten state or in the finely divided solid form (between 0.1 and 10 $\mu$m, for example). It would not be departing from the scope of the invention to use several polymers (A).

Mention may be made, as examples of polymers (A), of polyolefins, which are optionally functionalized, polyamides or polyphenylene oxide. As regards a polymer (A) which is a polyolefin, it can be functionalized or nonfunctionalized and can be a blend of at least one functionalized and/or of at least one nonfunctionalized polyolefin. For simplicity, functionalized polyolefins (A1) and nonfunctionalized polyolefins (A2) have been described below.

A nonfunctionalized polyolefin (A2) is conventionally a homopolymer or copolymer of $\alpha$-olefins or diolefins, such as, for example, ethylene, propylene, 1-butene, 1-octene or butadiene. Mention may be made, by way of examples, of:

homopolymers and copolymers of ethylene, in particular LDPE, HDPE, LLDPE (linear low density polyethylene), VLDPE (very low density polyethylene) and metallocene polyethylene;

homopolymers or copolymers of propylene;

ethylene/$\alpha$-olefin copolymers, such as ethylene/propylene, EPRs (abbreviation for ethylene-propylene rubber) and ethylene/propylene/diene (EPDM);

styrene/ethylene-butene/styrene (SEBS), styrene/butadiene/styrene (SBS), styrene/isoprene/styrene (SIS) or styrene/ethylene-propylene/styrene (SEPS) block copolymers;

copolymers of ethylene with at least one product chosen from salts or esters of unsaturated carboxylic acids, such as alkyl (meth)acrylate (for example, methyl acrylate), or vinyl esters of saturated carboxylic acids, such as vinyl acetate, it being possible for the proportion of comonomer to reach 40% by weight.

The functionalized polyolefin (A1) can be a polymer formed from $\alpha$-olefins having reactive units (the functionalities); such reactive units are acid, anhydride or epoxy functional groups. Mention may be made, as examples, of the preceding polyolefins (A2) grafted or co- or terpolymerized with unsaturated epoxides, such as glycidyl (meth)acrylate, or with carboxylic acids or the corresponding salts or esters, such as (meth)acrylic acid (it being possible for the latter to be completely or partially neutralized by metals, such as Zn, and the like), or with carboxylic acid anhydrides, such as maleic anhydride. A functionalized polyolefin is, for example, a PE/EPR blend, the ratio by weight of which can vary within wide limits, for example between 40/60 and 90/10, the said blend being cografted with an anhydride, in particular maleic anhydride, according to a degree of grafting, for example, from 0.01 to 5% by weight.

The functionalized polyolefin (A1) can be chosen from the following (co)polymers, grafted with maleic anhydride or glycidyl methacrylate, in which the degree of grafting is, for example, from 0.01 to 5% by weight:

PE, PP or copolymers of ethylene with propylene, butene, hexene or octene comprising, for example, from 35 to 80% by weight of ethylene;

ethylene/α-olefins copolymers, such as ethylene/propylene, EPRs (abbreviation for ethylene-propylene rubber) and ethylene/propylene/diene (EPDM);

styrene/ethylene-butene/styrene (SEBS), styrene/butadiene/styrene (SBS), styrene/isoprene/styrene (SIS) or styrene/ethylene-propylene/styrene (SEPS) block copolymers;

ethylene and vinyl acetate (EVA) copolymers comprising up to 40% by weight of vinyl acetate;

ethylene and alkyl (meth)acrylate copolymers comprising up to 40% by weight of alkyl (meth)acrylate;

ethylene and vinyl acetate (EVA) and alkyl (meth)acrylate copolymers comprising up to 40% by weight of comonomers.

The functionalized polyolefin (A1) can also be chosen from ethylene/propylene copolymers, predominantly of propylene, grafted with maleic anhydride and then condensed with monoamino polyamide (or a monoamino polyamide oligomer) (products disclosed in EP-A-0342066).

The functionalized polyolefin (A1) can also be a co- or terpolymer of at least the following units: (1) ethylene, (2) alkyl (meth)acrylate or vinyl ester of saturated carboxylic acid and (3) anhydride, such as maleic anhydride, or (meth)acrylic acid or epoxy, such as glycidyl (meth)acrylate. Mention may be made, as examples of functionalized polyolefins of the latter type, of the following copolymers, where ethylene preferably represents at least 60% by weight and where the termonomer (the functional group) represents, for example, from 0.1 to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers;

ethylene/vinyl acetate or alkyl (meth)acrylate/(meth)acrylic acid or maleic anhydride or glycidyl methacrylate copolymers.

In the preceding copolymers, (meth)acrylic acid can be salified with Zn or Li.

The term "alkyl (meth)acrylate" in (A1) or (A2) denotes C1 to C8 alkyl methacrylates and acrylates and can be chosen from methyl acrylate, ethyl acrylate, n-butyl acrylate, isobutyl acrylate, 2-ethylhexyl acrylate, cyclohexyl acrylate, methyl methacrylate and ethyl methacrylate.

The copolymers mentioned above, (A1) and (A2), can be copolymerized in a random or block fashion and can exhibit a linear or branched structure.

The molecular weight, the MFI index and the density of these polyolefins can also vary within wide limits, which a person skilled in the art will appreciate. MFI is the abbreviation for melt flow index. It is measured according to ASTM Standard 1238.

The functionalized polyolefins (B1) are advantageously chosen from any polymer comprising α-olefin units and units carrying polar reactive functional groups, such as epoxy, carboxylic acid or carboxylic acid anhydride functional groups. Mention may be made, as examples of such polymers, of terpolymers of ethylene, of alkyl acrylate and of maleic anhydride or of glycidyl methacrylate, such as the Lotader® products from the Applicant Company, or polyolefins grafted with maleic anhydride, such as the Orevac® products from the Applicant Company, and terpolymers of ethylene, of alkyl acrylate and of (meth)acrylic acid. Mention may also be made of homopolymers or copolymers of propylene which are grafted with a carboxylic acid anhydride and then condensed with monoamino polyamides or monoamino polyamide oligomers.

The lactam can be caprolactam or lauryllactam or their blend and the polymer (A) can be PA 6 or PA 12. Any combination of these possibilities can be used.

Mention may be made, as examples of fillers in the fourth form of the invention, of the first or of the second embodiment, of glass or carbon fibres or else of inorganic fillers, such as, for example, glass beads.

The polyamides of the invention can also comprise additives such as:

dyes;

pigments;

optical brighteners;

antioxidants;

UV stabilizers;

it being possible for these additives to be introduced during the polymerization provided that they are inert with the respect to the anionic polymerization of the lactams.

Further to the stage (b) in the first embodiment of the invention the polyamide can be recovered in the form of pellets or directly transformed in objects, films, tubes, profiles. It has been discovered that the objects, films, tubes and profiles contain a very low amount of residual monomer as compared with the process of the prior art described in EP 786485, EP 872508, EP 786482 and EP 791618. It is the same for the objects made in the stage (b1) in the second embodiment of the invention.

In the following examples, the polyamides obtained are characterized by their intrinsic viscosity. The intrinsic viscosity ($\eta$) is measured with an Ubbelhode viscometer a 25° C. in metacresol for 0.5 g of polymer in 100 ml of metacresol. This principle is described in Ullmann's Encyclopedia of Industrial Chemistry—Vol. A 20, p. 527–528 (1995-5th edition).

The polyamides are also characterized by measurement of their mass, which is measured by GPC (gel permeation chromatography), also known as SEC (steric exclusion chromatography). In the present application, the term SEC denotes the measurement of the molecular masses of polymers by steric exclusion chromatography. This technique, and more particularly its application to polyamides and to polyamide-block-polyethers, is described in "Journal of Liquid Chromatography, 11(16), 3305–3319 (1988)".

EXAMPLES

Example 1

Various Regulators are Tested

Procedure

1. Preparation of the Reaction Mixture

Lactam 12 treated with 25 molar % of sodium is prepared beforehand in the following way:

approximately 20% of a certain amount of lactam 12 are distilled under nitrogen and under vacuum, so as to ensure the dehydration thereof;

25 molar % of sodium are introduced portionwise into the undistilled part of the lactam. This addition is carried out while flushing with nitrogen and with stirring, at a temperature of less than 100° C.

2. Polymerization

The mixture is rendered inert and brought to 260° C. The polymerization begins by introduction of 1 molar % of acetanilide.

Results Obtained

| Regulator<br>(1 molar %)<br>and 1% of NaH | Polymerization<br>time<br>(min) | Intr. viscosity<br>(0.5% by weight<br>in m-cresol) |
|---|---|---|
| acetanilide | 11.87 | 1.2 |
| (4-ethoxyphenyl)acetamide | 12.27 | 1.18 |
| benzanilide | 12.6 | 1.15 |
| N-methylacetamide | 12.4 | 1.24 |
| N-ethylacetamide | 13.41 | 1.3 |
| N-methylformamide | 11.94 | 1.45 |

Tests at 270° C.

Procedure

Acetanilide or N,N'-ethylenebisstearamide, NaH and L12 or L6 respectively are weighed out in a reactor and rendered inert. The L6 and L12 reaction mixtures are prepared at 160° C. The start of the reaction takes place by heating to 270° C. The polymerization time given is the torque rise time:

| Regulator<br>(x molar %)<br>and x% of NaH<br>with respect to the lactam | Polymerization<br>Time<br>(min) | intr. viscosity<br>(0.5% by weight<br>in m-cresol) | Lactam |
|---|---|---|---|
| Acetanilide (0.96/0.96) | 2–3 | 1.22 | L12 |
| Ethylenebisstearamide (0.48/0.97) | 2–3 | 1.1 | L12 |
| ethylenebisstearamide (0.19/0.37) | 2–3 | 1.1 | L6 |

Acetanilide: 1 functionality per mol
EBS: 2 functionalities per mol

Example 2

The stability of the solution (a) at 160° C. is shown

A—Acetanilide/NaH/L12 mixture.

Procedure (Maintenance at 160° C.)

Acetanilide, NaH and L12 (lactam 12) are weighed out in a reactor which has been rendered inert. The mixture is brought to and is maintained at 160° C. under an anhydrous atmosphere. The L12 content was evaluated by chromatography.

| Duration of<br>stability test at<br>160° C. | % residual L12 | Molar %<br>with respect to the lactam<br>acet./HNa |
|---|---|---|
| (2 h) | 98.1 | 0.98/1.1 |
| (4 h) | 96.1 | 0.95/1.06 |
| (7 h) | 97.9 | 0.95/1.06 |
| (24 h) | 99.2 | 0.95/1.06 |
| (48 h) | 49.1 | 1.1/1.1 |

B—N,N'-Ethylenebisstearamide (EBS) mixture.

Procedure (Maintenance at 160° C.)

EBS, NaH and L12 (L6) are weighed out in a reactor which has been rendered inert. The mixture is brought to and is maintained at 160° C. under an anhydrous atmosphere for 24 hours. After 24 hours, the L12 (L6) content was evaluated.

| Duration of stability<br>test at 160° C. | % residual<br>lactam | Molar %<br>with respect to the<br>lactam<br>EBS/Hna | Lactam |
|---|---|---|---|
| (24 h) | 92 | 0.57/1.1 | L12 |
| (24 h) | 98 | 0.55/1.0 | L6 |

EBS = Ethylenebisstearamide: 2 functionalities per mol

The reactivity after storage is now shown.

Procedure: Preparation of Sodium Acetanilide 40g of finely ground sodium hydroxide are poured into a 6 l 3-necked round-bottomed flask equipped with a powerful stirrer and a water separator and comprising 4 l of benzene. The mixture is maintained at boiling point, so as to entrain any traces of water, and then 135 g (1 mole) of acetanilide are added.

The progress of the shift in equilibrium is monitored by the amount of water entrained by the benzene. Thus, 92 to 94% of the theoretical amount is recovered in the water separator over approximately 8 hours.

The benzene is evaporated at 60° C./20 mm and then at 60° C./0.5 mm. The infrared spectrum of the sodium acetanilide exhibits an intense band characteristic of the $[N{-}C{=}O]^-Na^+$ structure at 1563 $cm^{-1}$. Only a slight shoulder remains at 1665 $cm^{-1}$ characteristic of the free carbonyl of the acetanilide. The NH band at 3400 $cm^{-1}$ has disappeared. The amount of free acetanilide remaining in the sodium acetanilide can therefore be evaluated at less than 5% by this method.

Procedure: Stability of the Reaction Mixture and then its Reactivity

Series a

A series of tubes comprising lactam 12 and 1 molar % of sodium acetanilide was heated to 165° C. The lactam 12 of the samples was extracted in the following way: extraction of the sample in a Soxhlet device with ethanol for 2 hours, followed by placing in an oven for 16 hours at 150° C./0.3 mm The polymerization only begins after 32 hours and its progress is very slow. 2 tubes maintained at 165° C. for 64 hours were heated to 270° C. The polymerization took place normally to result in a PA with an intr. viscosity of 1.28.

Series b:

The reaction mixture, using L12, is melted at 160° C. and maintained at this temperature with various durations, and then the polymerization takes place by increasing the temperature to 270° C.

| Test ref. Reactivity test (160° C., then 270° C.) | Intr. viscosity dl/g | GPC Mw g/mol | GPC Mn g/mol | PI | GC: % residual L12 | Molar % regulator /NaH with respect to 100 mol of lactam |
|---|---|---|---|---|---|---|
| | | | Acetanilide | | | |
| (1 h) | 1.18 | 25 120 | 11 260 | 2.25 | 0.19 | 1.1 / 1.1 |
| (6 h) | 1.18 | 25 230 | 10 730 | 2.35 | 0.2 | 1.1 / 1.1 |
| (22 h 45) | 1.15 | 24 510 | 11 170 | 2.2 | 0.22 | 1.1 / 1.1 |
| (48 h) | 1.11 | 23 200 | 9175 | 2.55 | 0.25 | 1.1 / 1.1 |
| | | | EBS | | | |
| (30 min) | 1.1 | 19 200 | 9000 | 2.15 | 0.19 | 0.48/0.97 |
| (6 h) | 1.08 | 17 800 | 7700 | 2.3 | 0.16 | 0.57/1.1 |

Acetanilide:1 functionality per mol
EBS = Ethylenebisstearamide:2 functionalities per mol Example 3

Finally, the reactivity of the reaction mixture after cooling to ambient temperature will be shown.

a) Preparation of the Reaction Mixture 48 mg (2 mmol) of NaH and 593 mg (1 mmol) of EBS (N,N'-ethylenebisstearamide) are dissolved in 50 g of lauryllactam at 160° C. in a 250 ml round-bottomed flask while flushing with nitrogen. After homogenizing the solution, the reaction mixture is cooled to ambient temperature while flushing with nitrogen. The cooled mixture represents a homogeneous and crystalline product which can be stored at ambient temperature. It is recommended to store this product with moisture excluded.

b) Polymerization of the Reaction Mixture

The crystalline reaction mixture is reheated to 160° C. while flushing with nitrogen and then poured into a Haake Rheocord mixer which is preheated to 270° C. The mixture is kneaded with a stirring rate of 60 revolutions per minute (rpm). After having reached the torque maximum (2 to 3 minutes), the polyamide is recovered and cooled (quenched) between two metal plates. The content of residual L12 present in the polymer, obtained by gas chromatography, is 2.1% and the molecular masses, obtained by GPC, give an Mw of 34 400 g/mol and an Mn of 16 400 g/mol.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/12084, filed Sep. 22, 2000, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the anionic polymerization of lactams, comprising:
    (a) dissolving in molten lactam (i) a lactamate, a catalyst capable of creating a lactamate, or a combination thereof and (ii) a regulator chosen from amides of formula R1-NH—CO-R2, in which R1 is unsubstituted or substituted by R3-CO—NH—or R3-O— and in which R1, R2 and R3 are each independently aryl, alkyl or cycloalkyl,
    (a1) cooling the solution from stage (a) to the solid state in a form which can be divided,
    (a2) optionally reheating the product from stage (a1) to a temperature below the polymerization temperature of the lactam,
    (a3) optionally reheating the product from stage (a1) and maintaining the product from stage (a1) at a temperature between the melting temperature of the lactam and 15° C. above said melting temperature,
    (b) introducing the product from any one of stages (a1), (a2) or (a3) into a mixing device or into a mold and then heating said product to a temperature sufficient to obtain the bulk polymerization of the lactam.

2. A process according to claim 1, further comprising introducing molten lactam which does not contain a mixture of catalyst and regulator into stage (b).

3. A process according to claim 2, wherein polymerization of the lactam is carried out in the presence of at least one polymer (A) which is introduced into (i) the solution (a), (ii) the mixing device or mold of stage (b), (iii) the molten lactam which does not contain a mixture of catalyst and regulator, or (iv) any combination thereof.

4. A process according to claim 2, wherein polymerization of the lactam is carried out in the presence of at least one filler which is introduced into (i) the solution (a), (ii) the mixing device or mold of stage (b), (iii) the molten lactam which does not contain a mixture of catalyst and regulator, or (iv) any combination thereof.

5. A process for the anionic polymerization of lactams comprising:
    (a) dissolving in molten lactam (i) a lactam, a catalyst capable of creating a lactamate, or a combination thereof and (ii) a regulator chosen from amides of formula R1-NH—CO-R2, in which R1 is unsubstituted or substituted by an R3-CO—NH—or R3-O—radical and in which R1, R2 and R3 are each independently aryl, alkyl or cycloalkyl,
    (a1) cooling the solution from stage (a) to the solid state in a form which can be divided,
    (a2) optionally reheating the product from stage (a1) to a temperature below the polymerization temperature of the lactam, (a3) optionally reheating, the product from stage (a1) and maintaining the product from stage (a1) at a temperature between the melting temperature of the lactam and 15° C. above said melting temperature, (b1) introducing the product from any one stages (a1), (a2) or (a3) into a mold and then heating said product to a temperature sufficient to obtain the bulk polymerization of the lactam, 6. A process according to claim 5, further comprising adding molten lactam which does not contain catalyst and regulator into stage (b1), and this molten lactam is optionally blended in line with lactam originating from any one of stages (a1), (a2) or (a3), before introduction into said mold.

7. A process according to claim 6, in which the polymerization of the lactam is carried out in the presence of at least one polymer (A) which is introduced into (i) the solution from stage (a), (ii) the mold of stage (b1), (iii) the molten lactam which does not contain catalyst and regulator, (iv) during in line blending of lactam originating from any one of stages (a1), (a2) or (a3) and of the lactam which does not contain catalyst and regulator, or (v) any combination thereof.

8. A process according to claim 6, wherein polymerization of the lactam is carried out in the presence of at least one filler which is introduced into (i) the solution from stage (a), (ii) the mold of stage (b1), (iii) molten lactam which does not contain catalyst and regulator, (iv) during in line blending of lactam originating from any one of stages (a1), (a2) or (a3) and of the lactam which does not contain catalyst and regulator, or (v) any combination thereof.

9. A process according to claim 1, wherein said catalyst is sodium, potassium, alkali metal hydride, alkali metal hydroxide, alkali metal alkoxide or combination thereof.

10. A process according to claim 1, wherein said regulator is selected from the group consisting of acetanilide, benzanilide, N-methylacetamide, N-ethylacetamide, N-methylformamide, (4-ethoxyphenyl)acetamide, alkylenebisamides, and any combination thereof.

11. A process according to claim 1, wherein the ratio of the catalyst to the regulator, in moles, is between 0.5 and 2, the number of moles of regulator being expressed as the number of moles of amide groups.

12. A process according to claim 1, wherein the proportion of catalyst in the lactam in stage (b) is between 0.1 and 5 mol per 100 mol of lactam.

13. A process according to claim 1, wherein the lactam is lauryllactam, and stage (b) is conducted at a temperature between 200 and 350° C.

14. A process according to claim 13, further comprising conducting stage (a3) and stage (a3) is conducted at a temperature between 155 and 180° C.

15. A process according to claim 1, wherein component (a)(i) is a lactamate or a combination of a lactamate and said catalyst.

16. Lactam in the solid form:
comprising (i) lactamate, a catalyst capable of creating a lactamate or a combination thereof, and (ii) a regulator chosen from amides of formula R1-NH—CO-R2, in which R1 is substituted or substituted by R3-CO—NH— or R3-O— and in which R1, R2 and R3 are each independently aryl, alkyl or cycloalkyl radical,
it being possible for this solid form to be divided.

17. A lactam according to claim 16, wherein component (a)(i) is a lactamate or a combination of a lactamate and said catalyst.

18. A process according to claim 1, wherein the catalyst is sodium methoxide or sodium ethoxide.

19. A process according to claim 11, wherein the molar ratio of catalyst to regulator is between 0.8 and 1.2 and the proportion of catalyst in stage (b) is between 0.3 and 1.5 per mol of lactam.

20. A process according to claim 14, wherein the temperature of stage (a3) is between 160 and 170° C. and the temperature of stage (b) is between 230° and 300° C.

21. A process according to claim 9, wherein the regulator is at least one member selected from the group consisting of acetanilide, benzanilide, N-methylacetamide, N-ethylacetamide, N-methylformamide, (4-ethoxyphenyl)acetamide, alkylenebisamides, and any combination thereof.

22. A process according to claim 11, wherein the regulator is ethylene bisstearamide or ethylenebisoleamide.

23. A process according to claim 1, comprising conducting stage (a1) so as to obtain particulate solids.

24. A process according to claim 23, further comprising conducting stage (a2).

25. A process according to claim 23, further comprising conducting stage (a3).

26. A process according to claim 1, wherein component (a)(i) is a catalyst capable of creating a lactamate.

27. A process according to claim 3, wherein said at least one polymer (A) is selected from nonfunctionalized polyolefins, functionalized polyolefins, polyamides, and polyphenylene oxide.

28. A process according to claim 7, wherein said at least one polymer (A) is selected from nonfunctionalized polyolefins, functionalized polyolefins, polyamides, and polyphenylene oxide.

29. A process according to claim 1, wherein R1, R2, and R3 are each, independently, phenyl, para-tolyl, a-naphtyl, methyl, ethyl, n-propyl, n-butyl, or cyclohexyl.

30. A process according to claim 1, wherein R1 and R2 are each, independently, phenyl or alkyl having up to 5 carbon atoms, R1 is unsubstituted or substituted by R3-O—, and R3 is alkyl having up to 5 carbon atoms.

31. A process according to claim 1, wherein said lactam is β, β– dimethyipropiolactam, α,α-dimethylpropiolactam, amylolactam, caprolactam, capryllactam or lauryllactam.

32. A process according to claim 1, wherein the ratio of the catalyst to the regulator, in moles, is between 0.8 and 1.2, the number of moles of regulator being expressed as the number of moles of amide groups.

33. A process according to claim 1, wherein stage (b) is conducted at a temperature between 200 and 350° C.

34. A process according to claim 1, wherein stage (b) is conducted at a temperature between 230 and 300° C.

35. A process according to claim 1, further comprising bringing the product of stage (a1) into divided form before the product of stage (a1) is introduced into stage (b).

36. A process according to claim 1, wherein the product of stage (a1) is a solution, in divided solid form, and the solution consists essentially of said lactam, said lactamate and/or catalyst, and said regulator.

37. A process according to claim 1, wherein polymerization of the lactam is carried out in the presence of at least one polymer (A) which is introduced into (i) the solution (a), (ii) the mixing device or mold of stage (b), or (iii) a combination thereof.

38. A process according to claim 1, wherein polymerization of the lactam is carried out in the presence of at least one filler which is introduced into (i) the solution (a), (ii) the mixing device or mold of stage (b), or (iii) a combination thereof.

39. A process according to claim 5, wherein polymerization of the lactam is carried out in the presence of at least one polymer (A) which is introduced into (i) the solution from stage (a), (ii) the mold of stage (b1), (iii) the molten lactam which does not contain catalyst and regulator, or (iv) any combination thereof.

40. A process according to claim 5, wherein polymerization of the lactam is carried out in the presence of at least one filler which is introduced into (i) the solution from stage (a), the mold of stage (b), (ii) the mold of stage (b1), (iii) molten lactam which does not contain catalyst and regulator, or (iv) any combination thereof.

* * * * *